March 8, 1927.
E. O. RUTTER
1,620,291
SWIVELING HEADLIGHT OF AUTOMOBILES
Filed April 24, 1925
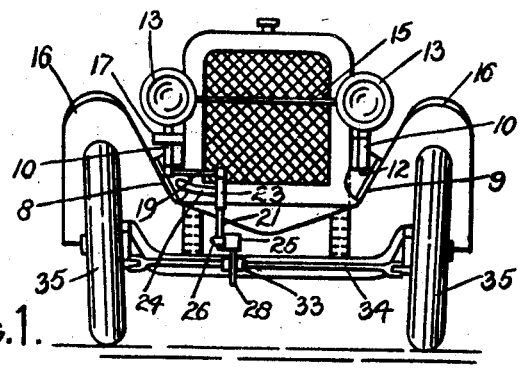
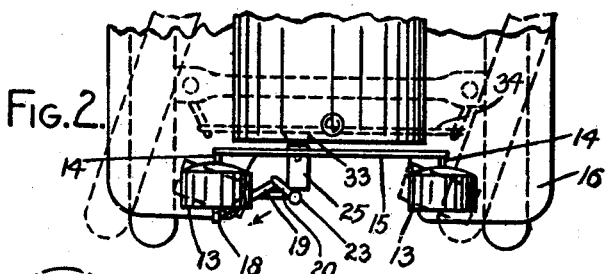
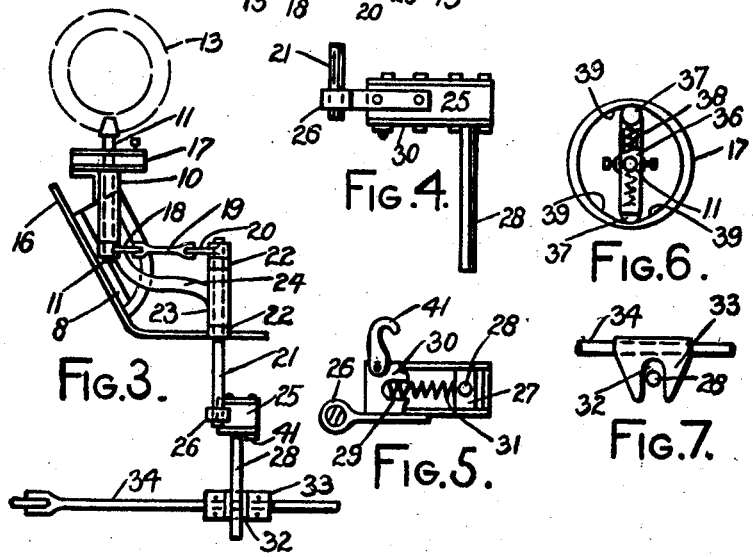
INVENTOR
ESSINGTON ODERNHEIMER RUTTER
By his Patent Attorneys Patented Mar. 8, 1927.

1,620,291

UNITED STATES PATENT OFFICE.

ESSINGTON ODERNHEIMER RUTTER, OF BANGAROO, NEAR CANOWINDRA, NEW SOUTH WALES, AUSTRALIA.

SWIVELING HEADLIGHT OF AUTOMOBILES.

Application filed April 24, 1925. Serial No. 25,504.

This invention relates to the duplex headlights of automobiles which have the fore or steering draught wheels on stub axles connected together by a tie-rod operated by the steering arm from the steering wheel and it has been specially devised in order that such duplex headlights will swivel synchronously with the steering motion of the fore wheels so that said headlights will steadily project their rays straightforwardly in every turning position that the said fore wheels occupy and thereby enable the driver to closely view the track he proposes to travel and this without flecking of the light from side to side under rectification movements necessary in steering and in addition with quick return of the headlights to straight ahead position on completion of a turning movement.

According to these improvements in and relating to swiveling headlights of automobiles each headlight is revolvable by a vertical or approximately vertical swivel stem in a bracket affixed to the front of the chassis of the automobile and each stem has a short radial arm with a common connecting rod between both. An offset bearing sleeve from one of the headlight brackets carries a vertical shaft connected by a link and cranks to the swivel stem of the nearer headlight and said shaft has a radial arm preferably having a slot in which is a resiliently buffered slidable shoe. A rod from the arm or from the shoe depends into a double hook or a slot on or in a plate or bracket on the steering tie-rod and said depending rod is provided with reasonable clearance in the said double hook or slot. Further spring devices are arranged in or on one or in or on both of the swivel stems of the headlights adapted to restore or return said headlights after any turning movement back to normal straight ahead position.

But in order that this invention may be readily carried into practical effect the same will now be described with reference to the drawings (which are more or less schematic) accompanying and forming part of this complete specification.

Fig. 1 is a front or head-on elevation and Fig. 2 a fragmentary plan respectively of an automobile to which this invention is applied. While on enlarged scale Fig. 3 shows a front elevation of the improvements and the other figures details thereof. Fig. 4 is a side view and Fig. 5 a reverse plan respectively of the shoe radial arm, Fig. 6 is a plan with cover removed of one construction of tension device for returning the headlights to normal straight ahead position and Fig. 7 is a plan of the steering tie-rod double hook or bracket.

At each side of the front of the automobile brackets 8 and 9 are bolted or affixed in any suitable way to the automobile head say to the mudguard 16. Each of these brackets supports a vertical bearing sleeve 10 say integral therewith and carrying one or other of the swivel stems 11 and 12 each having a short arm or crank 14 both connected by link 15.

The swivel stem 11 at its lower end has a radial arm 18 fast thereto connected by rod 19 to a second radial arm 20 fast to vertical shaft 21 held by collars 22 in bearing sleeve 23 supported by offset 24 from bracket 8. A radial arm having in a preferred construction a slot or say a box 25 having removable top and bottom covers is clipped by collar 26 to vertical shaft 21 and carries a slidable shoe 27 from which a rod 28 depends through a slot 29 in the bottom cover 30. In box 25 is a spring 31 arranged to keep shoe 27 normally pressed outwardly with the rod 28 engaged in the double hook or slot 32 in bracket 33 fast to tie-rod 34 of the fore wheels 35. The double hook or slot 32 is of such size that the rod 28 has appreciable clearance therein and will not be moved thereby by any rectification of slight auto-divergence of course of steering as hereinafter explained.

The headlight swivel stem 11 has loose on it but fast to bearing 8 (see Fig. 6) a circular case 17 and said stem 11 has fast thereto say by keys or set screws a hollow crossbar 36 carrying in its slot or hollow rollers 37 pressed outwardly by springs 38 and which rollers 37 are adapted to run on or in the inner face of the circumferential wall of the case 17 and which wall has an angular niche therein so as to form reverse and meeting slants 39 at diametrically opposite points of the wall and at right angles to points straight ahead.

In steering as a turn of the fore wheels of the automobile is made the tie-rod 34 moving as ordinarily carries the hook bracket 33 with it and the double hook 32 contacts with and moves rod 28 which in turn partly revolves shaft 21 which latter movement is transmitted through radial arms 20 and 18 and link 19 to the headlight stem 11 which swivels the headlight 13 to the direction of the fore wheels 35 and at the same time by arms 14 and link 15 also the other headlight 13. While the automobile is advancing in a more or less straight course no flecking of the light from side to side under normal auto divergences of course and rectification movements by the steering will occur as the clearance provided in the double hook 32 for the rod 28 will allow of appreciable turning movement of the fore wheels 35 before the contact of said double hook 32 with rod 28 takes place to move headlights 13.

During the part-revolving movements of swivel stem 11 the rollers 37 in cross bar 36 are kept in contact with the wall of the circular case 17 by springs 38 and are caused to emerge from the meeting slants 39. As the fore wheels 35 are returned to straight ahead position the various parts function again as before described and the rollers 37 being pushed by their springs 38 run along the slants to reverse apex thereof and bring said cross bar 36 with the stem 11 to normal straight ahead position. The headlights 13 move likewise and synchronously with said fore wheels 35 but there is no lagging of said headlights 13 by reason of the clearance of rod 28 in double hook 32 because as the momentary tension is relaxed upon the stem 11 the rollers 37 will move the cross bar 36 as before described.

In daylight or to temporarily dispense with the described devices the rod 28 is disengaged from and moved backwardly (as allowed by the shoe 27 pressed against spring 31) from double hook 32 and locked back by pivoted hook 41. Of course upon release of said hook 41 the spring 31 presses the shoe 27 forwardly with the rod 28 which engages with said hook 32 again.

If it is desired the shoe 27 and its parts might be dispensed with and the radial arm 18 on the axle 11 may be extended downwardly and be adapted to enter a forked or slotted bracket fast to the tie-rod 34.

It is to be clearly understood that the carrying into practical effect of this invention is not confined to the precise constructions of the various elements or mechanism described and illustrated so long as the nature and mechanical attributes thereof are retained for many variations of the described constructions and arrangements together of the respective functional parts or integers without departure from the intent and scope of the invention will suggest themselves to those skilled in the art to which said invention appertains.

I claim:—

1. A swiveling mount for automobile headlights including a stem for each light pivotally supported, a linkage between said stems to maintain the lights in approximately parallel relationship, an extension on the supporting stem of one light, a crank arm thereon, a shaft mounted parallel to said stem, a crank thereon, a linkage connecting said cranks for simultaneous operation therewith, a second crank on said shaft, a rod fixed on said second crank parallel to said shaft, a slotted bracket carried by a tie-rod associated between the steering mechanism and steering wheels of the automobile, said first rod being positionable between and spaced from the walls of said slot.

2. In and for the swiveling of the headlights of automobiles synchronously with the steering motion of the fore wheels in combination with the fore draught and steering wheels and revolvably mounted duplex headlights linked together a bearing bracket affixed to the vehicle above the steering tie-rod a vertical shaft carried in said bearing bracket a crank from said vertical shaft linked to the swivel stem of one headlight a radial arm or crank from said vertical shaft a rod from said last mentioned crank depending to a slot of a bracket fast to the said tie-rod as and for the purposes set forth substantially as herein described and explained.

3. In and for the swiveling of the headlights of automobiles synchronously with the steering motion of the fore wheels in combination with the fore draught and steering wheels and revolvably mounted duplex headlights linked together a bearing bracket affixed to the vehicle near the steering tie-rod a vertical shaft carried in said bearing bracket a crank linked to the swivel stem of one headlight, a radial crank from said vertical shaft with a longitudinal recess therein a sliding shoe retained at one end of said slot by a spring a rod from said shoe depending to a double hook of a bracket fast to the said tie-rod as and for the purposes set forth substantially as herein described and explained.

4. In and for the swiveling of the headlights of automobiles synchronously with the steering motion of the fore wheels in combination with duplex swiveled headlights linked together, brackets such as 8 and 9 having bearings such as 10 swivel stems such as 11 and 12 cranks such as 14 link such as 15 radial arms such as 18 and 20 connecting rod such as 19 vertical shaft such as 21 bearing such as 23 on offset such as 24 hollow crank such as 25 with collar such as 26 shoe such as 27 depending rod such as 28 cover such as 30 with slot such as 29 spring such as 31 fastening hook such as 41 double hook such as 32 and bracket such as 33 as and for the purposes set forth substantially as herein described and explained and as illustrated in the drawings.

5. A swiveling mount for automobile headlights including a stem for each light pivotally supported, a linkage between said stems to maintain the lights in approximately parallel relationship, an extension on the supporting stem of one light, a shaft mounted parallel to said stem and linked thereto for simultaneous swiveling operation therewith, a crank on said shaft, a rod on said crank parallel to said shaft, a slotted bracket carried by a tie-rod associated between the steering mechanism and steering wheels of the car, said first rod being positionable between and spaced from the walls of said slot, and tension devices arranged around the stem of a light to restore the lights to normal forward position.

6. In and for the swiveling of the headlights of automobiles synchronously with the steering motion of the fore heels in combination with duplex swiveled headlights connected to the fore draught and steering wheels, pivotal stems mounting each light and linked together for concomitant angular movement, a support for each stem, a crank at the base of one of said stems, a vertical shaft parallel to said stem, and provided with a crank linked to said first crank for simultaneous oscillation therewith of said stem and shaft, spaced actuating means on the tie-rod of the automobile, a rod operated thereby for reciprocating movement, said vertical shaft being connected by crank means to the second rod and rotated by movements of the same to move said headlights and a tension device on the stem of a light to return said headlights back to normal or straight ahead position substantially as herein described and explained.

7. Means for returning a headlight to normal position, including a stem pivotally supporting said light, a hollow cross bar at right angles thereto, a ball having a moving fit in said cross bar, a spring in said bar biasing said ball outwardly, an approximately circular case surrounding said stem and cross arm, a circumferential wall forming a flange on said case, the inner wall of said flange being elliptical in plan with its longer axis lying in the direction in which the light is to point, said arm being of such length that the ball is retained therein while rotating around following its elliptical track on the flange of the case.

In testimony whereof I have signed my name to this specification.

E. O. RUTTER.